United States Patent Office 3,400,019
Patented Sept. 3, 1968

3,400,019
ELECTRODE INCLUDING NON-
METALLIC SUBSTRATE
Joseph Adrien M. Le Duc, Short Hills, N.J., assignor to
Pullman Incorporated, Chicago, Ill., a corporation of
Delaware
No Drawing. Original application Dec. 26, 1961, Ser. No.
162,221, now Patent No. 3,235,473, dated Feb. 15,
1966. Divided and this application Mar. 24, 1965, Ser.
No. 449,668
1 Claim. (Cl. 136—120)

This is a division of application Ser. No. 162,221, filed Dec. 26, 1961, now Patent No. 3,235,473.

This invention relates to an improved electrode and method for the manufacture thereof. In one aspect the invention relates to an improved gas diffusion electrode of low resistivity. In another aspect this invention relates to a method of making a porous electrode having a continuous layer of conductive material on an inert substrate.

Commercialization of fuel cells has been handicapped by the difficulty experienced in providing electrodes having a low resistivity and which are inexpensive. Low resistance is especially important with respect to fuel cell electrodes since such cells usually generate current of low voltage. Conventional gas electrodes usually comprise carbon, metal powders or specially prepared porous metals. A disadvantage in using carbon electrodes is that heavier electrodes are required in order to obtain high current capacities. A drawback to the use of loose powdered metals in a pre-formed container is that it is difficult to control the voids between the particles so that the amount of gas which passes through the electrode without being absorbed is minimized. In the case of powder electrodes, it has been reported that a resinous thermoplastic may be used to act as a binder and to facilitate subsequent molding of the electrode. Although this latter type of electrode employs less electroconductive material than electrodes consisting of solid metal or metal powders, it has generally been believed that it is important to minimize the total quantity of binder in order to obtain satisfactory electrical conductivity. In addition to the fact that such electrodes are not too much less in cost than electrodes consisting of metal powder or solid metal, continuous contact of the particles of metal with each other by mere mechanical mixing is not achieved since the random distribution of resinous particles necessarily leads to separation of the metal particles by those of non-conductive binder.

In practice, gas diffusion electrodes whether fabricated of solid metal or powder are usually mounted on, or contained in, a perforated steel grid, screen or plate. Due to the fact that such supports and the conductive metal are held together by a weak mechanical metal-to-metal bond, the bond becomes weakened during subsequent fabrication and use thereby affecting the performance. The same type of difficulty is usually encountered with electrodes made by pasting metal salts onto a perforated metal support and converting the salt to elemental metal either by thermal or electrochemical techniques. Aside from overcoming such drawbacks, it also is desired to provide a process for producing electrodes which are more amenable to being formed into a variety of shapes.

It is an object of this invention to provide an electrode in which the total amount of electroconductive metal is reduced without sacrificing conductivity.

Another object is to provide an improved method for making electrodes having a continuous surface of an electroconductive material on another material which electrode possesses resistivity comparable to that of electrodes consisting substantially of the electroconductive material only.

Another object of this invention is to provide an electrode particularly useful in fuel cells in which a gas or liquid is used as fuel which electrodes have a minimum content of electrically conductive material, good physical strength and which are self-supporting.

A further object is to provide an improved gas diffusion electrode particularly useful in fuel cells in which an oxidizing gas such as oxygen or chlorine is used as a reactant.

A further object is to provide a gas diffusion electrode comprising silver and a diluent which electrode has conductivity properties comparable to that of a solid silver electrode.

A further object is to provide a process for the manufacture of electrodes having the above characteristics which process allows for the production of electrodes of a variety of shapes and forms, and is readily adapted to continuous operation.

A still further object is to provide an improved and economical method for producing electrodes having catalytic agents incorporated therein.

Various other objects and advantages of this invention will become apparent to those skilled in the art from the accompanying description and disclosure.

In accordance with the teachings of the invention, an electrode is provided, comprising an inert substrate having deposited on its surface a continuous film of electrically conductive material. By this invention, there also is provided a method of making an electrode particularly useful as a gas or liquid diffusion electrode, which method allows for the production of electrodes having a minimum content of electroconductive material without sacrificing desirable conductivity properties. By the process of this invention an inert solid such as polyethylene, for example, is contacted with a compound of an electroconductive metal and said compound is converted to elemental metal on the surface of the substrate as an adherent and continuous layer.

The inert substrate functions as a carrier and diluent for the electroconductive material and may be any solid commonly regarded as a non-conductor or electrical insulator, or as a poor conductor of electricity. Depending upon the particular end use of the completed electrode, the inert carrier may be porous or non-porous. When it is desired to produce gas or liquid diffusion electrodes, it is preferred to employ the inert substrate in a porous form. Suitable inert carriers are: polymeric materials including thermoplastics and synthetic and natural elastomers, typical examples of which are polyethylene, polypropylene, polyvinyl chloride, polystyrene, polyvinyl acetate, polybutadiene, polyisoprene, polychloroprene, polytrifluorochloroethylene, polytetrafluoroethylene, the thermoplastic and elastomeric polymers produced by copolymerization of trifluorochloroethylene with vinylidene fluoride or tetrafluoroethylene, condensation products of formaldehyde such as formaldehyde-phenol (Bakelite) and formaldehyde-urea plastics and casein; ion exchange materials of both the anionic and cationic type such as amberlites, halfilm, etc.; low conductors such as ceramics, metal oxide refractory materials, typical examples of which are titania, alumina, zirconia, silica, thoria, magnesia, zeolites, chromia, magnetite, porous graphite and asbestos; woven textiles such as woven graphite, woven asbestos, woven glass and woven inorganic fibers, deposited mats; parchments; porous glass, asbestos papers, Teflon coated fiber glass (woven) and other such materials generally regarded as being relatively inert to chemical attack or change.

The second essential component of the electrodes, of this invention is an electrically coinductive metal which may be any of the metals of Groups I-B, II-B and Groups III-VIII, inclusive, of the Periodic Chart of the elements (see H. G. Deming's Periodic Chart at pages 58–59 of Lange's Handbook of Chemistry, 7th edition) as well as the rare earth metals, and any combination of said electrically conductive metals. Typical examples of such metals which are incorporated into the inert substrate in accordance with the teachings of this invention are aluminum, copper, nickel, cobalt, iron, silver, gold, palladium, platinum, osmium, iridium, tantalum, titanium, manganese, zirconium and germanium, and alloys thereof such as cobalt-nickel alloys.

In accordance with the preferred embodiment of this invention, the deposition of the electrically conductive metal onto the surface of the inert carrier is accomplished by contacting the substrate with a solution of a compound of the metal and depositing elemental metal from the solution on the surface of the substrate by metal plating including electroless or chemical plating and electroplating techniques, or combination thereof. In accordance with any one of these methods, the substrate is first sensitized to deposit small amounts of metal on its surface, such sites acting as nucleating centers for the later deposition of a continuous film of metal. Sensitization of the substrate is accomplished by a two-stage process, the first stage of which comprises depositing a reducing agent on the surface of the substrate, and the second stage of which comprises contacting the substrate containing said reducing agent with a compound of a readily reducible metal. The second stage metal salt is one which is reduced by the substance used in stage one, and the nucleating metal is one more noble than the metal that is subsequently to be plated on the substrate. Typical examples of compounds employed in the first stage of the sensitization process are salts of a metal having a variable valence, the metal being present in a lower valence state, such as stannous chloride, as well as non-metallic reducing agents such as hydrazine. Typical examples of salts of the readily reducible metal employed in the second stage of the sensitization stage are palladous chloride and potassium gold cyanide and chloroplatinict acid. Particularly effective is the combination of stannous and palladium salts, the stannous ion leading to rapid reduction of the palladium ion to elemental palladium. In order to obtain homogeneous sensitization, each type of salt is preferably employed in the form of a solution, usually aqueous solutions having a salt concentration of between about 0.001 and about 1.0 molar. Generally the substrate is treated with each type of solution for between about 1 and about 10 minutes and is dried after each treatment to remove solvent.

After the metallic nucleating sites are incorporated into the portion of the substrate to be coated, it is treated to deposit a continuous film of electroconductive metal thereon. As noted above, this is accomplished by electroless or electroplating techniques or combination of such methods. When the electroplating technique is used, the sensitized substrate is first flash plated using the electroless technique to make its surface conductive.

Chemical deposition or electroless plating is accomplished by contacting the sensitized substrate with an electrolyte comprising a salt of the metal or metals to be deposited, a complexing agent and a reducing agent. The electrolyte is usually aqueous and the metal salts are applied in the form of a solution. Suitable electroless plating electrolytes are those comprising between about 0.1 and about 5 weight percent of a salt of the metal to be deposited such as copper sulfate, copper nitrate, nickel chloride, cobalt chloride, a mixture of nickel and cobalt chlorides, potassium gold cyanide, ferrous sulfate, tetrammine palladium chloride; and between about 0.01 and about 10 weight percent of the reducing agent, typical examples of which are sodium dihydrogen phosphites, Formalin and hydrazine. Suitable complexing agents are sodium citrate and sodium ethylene diamine tetra-acetate. Specific compositions of electrolyte and pH thereof varies depending upon the metal to be deposited. Typical and illustrative examples of suitable electrolyte solutions are as follows, the concentrations given being based on one liter of solution, (1) for electroless or flash plating of copper: copper sulfate (16 grams), sodium ethylene diamine tetraacetate (68 grams), sodium hydroxide (12 grams) and Formalin (75 cc. of a 38 percent solution); (2) for electroless plating of nickel: nickelous chloride hexahydrate (30 grams), sodium citrate (100 grams), sodium dihydrogen phosphite monohydrate (10 grams) and ammonium chloride (50 grams); (3) for electroless plating of cobalt: cobaltous chloride hexahydrate (30 grams), sodium dihydrogen phosphite monohydrate (20 grams), sodium citrate (35 grams) and ammonium chloride (50 grams); and (4) for the deposition of cobalt-nickel alloy: cobaltous chloride hexahydrate (30 grams), nickelous chloride hexahydrate (30 grams), sodium dihydrogen phosphite monohydrate (20 grams), Rochelle salt (200 grams and ammonium chloride (50 grams).

The coating of the substrate by chemical plating is carried out at a temperature between about 0° C. and about 100° C. depending upon the particular metal or metals to be deposited. Thus when depositing copper, nickel, or cobalt, the lower temperatures (e.g., about 20° C.) are usually employed, and when depositing cobalt-nickel alloys, the higher temperatures (e.g., about 95° C.) are preferred. By the chemical plating techniques, metal is deposited at a rate between about $10^{-5}$ and about $10^{-3}$ inches per hour.

After deposition of metal onto the sensitized surface of substrate by chemical plating, the substrate may be subjected to electroplating which is accomplished by placing the substrate as the cathode in conventional electroplating baths containing a steel anode and passing an electric current therethrough. In depositing silver, an electroplating bath comprising cyanides of silver and potassium in an aqueous alkaline medium is suitable, such baths usually comprising from about 0.5 to about 5 weight percent of the silver salt, from about 0.3 to about 10 percent of free silver, and between about 1 to about 10 weight percent of the potassium salt. For example, a typical standard silver electroplating bath contains on the basis of one gallon of solution: silver cyanide (4.8 ounces), potassium cyanide (8 ounces), potassium carbonate (2 ounces), metallic silver (3.5 troy ounces) and free cyanide (5.5 ounces). Metals such as aluminum, zinc, manganese, iron, gold, platinum, palladium, etc., are plated onto the substrate from conventional baths in like manner. The electroplating step is effected at a current density between about 1 and about 15 amperes per square foot of electrode surface and the bath is usually maintained at room temperature (20°–25° C.).

It is to be understood that included within the scope of this invention is treatment of the sensitized substrate to electroless plating to deposit a thin film of metal on the substrate such as a film having a thickness of about 0.1 mil, followed by electroplating to deposit a heavier layer of metal; the metal deposited by each technique may be the same or different.

As noted above, the above-described plating methods are particularly effective as a means of depositing the electroconductive material as a continuous layer or film on the surface of the substrate and, when a porous substrate is used, the metal is also deposited on and within the pores thereby achieving continuous contact between the pores. Deposition of a continuous layer of electroconductive metal is particularly important with respect to electrodes to be used in gas or liquid fuel cells inasmuch as uniform current distribution is realized and voltage drops within the electrode are minimized. In order to facilitate the deposition of the conductor within the substrate, the substrate is treated with any one of the above-described solutions employed in the sensitization or plating steps in such a manner that the solutions penetrate the interior of the substrate. This is readily accomplished by contacting the inert material while under vacuum to the treating solution so that the solution is drawn through the pores of the material.

In accordance with another embodiment of the process of this invention, a continuous layer of the conductor is deposited on the surface and in the pores of the substrate by the method which comprises contacting vapors of the conductor with the substrate, under vacuum. This technique comprises heating the metal to be deposited in a system evacuated to $10^{-5}$ to $10^{-6}$ mm. mercury pressure and at a temperature at which the vapor pressure of the metal becomes appreciable. The vapors are allowed to deposit on the surface of the substrate which is maintained at room temperature. The temperature at which some representative metals are vaporized are: aluminum (1000° C.), copper (1270° C.), gold (1400° C.), silver (1050° C.) and zinc (340° C.). For example, in accordance with this method, silver is deposited on the surface and in the pores of a porous plastic substrate by placing the substrate in a chamber evacuated to about $10^{-5}$ to about $10^{-6}$ mm. mercury and equipped with means for heating silver to about 1050° C. Heating of the silver is accomplished by placing it in or on a tungsten filament which is heated by passing an electric current therethrough. Other methods of heating the silver include placing it in a crucible which is heated, or by passing a current through a silver wire.

Other methods particularly useful for depositing a continuous film of conductor on the surface of and in the pores of a porous substrate, include sputtering and electrophoresis. The sputtering technique involves utilization of the metal to be deposited as a cathode in a system evacuated to approximately 0.3 to about 0.5 micron of mercury pressure and subjecting it to a high voltage of the order of between about 1000 and about 10,000 volts or higher. The metal is thereby stripped from the face of the cathode, travels to the substrate and deposits thereon as a continuous film. Deposition by electrophoresis is accomplished by placing the substrate between two inert electrodes in a vessel containing a colloidal suspension of the electroconductive material in a vehicle of low conductivity such as isopropanol or butanol, and impressing a large potential difference of the order of between about 200 and about 1000 volts direct current or higher on the electrode system.

Other methods of deposition include impregnation of the substrate with a solution, slurry or vapor comprising the compound to be deposited and reducing the metal ions to free metal on the surface of the substrate at elevated temperatures or by chemical reaction.

It is to be understood that although the above methods are described with particular reference to the manufacture of gas or liquid diffusion electrodes comprising the conductor evenly distributed throughout an inert porous material, the methods are also advantageously employed in depositing the conductor on the surface of a non-porous material.

By the process of this invention electrodes are provided having good conductivity and minimum metal contents. Notwithstanding the fact that the electroconductive material is diluted by an inert material, the process of this invention allows for the formation of electrodes having conductivity equivalent to that of a solid conductor without a material increase in the resistivity. It is known that the various metals differ in their ability to conduct electricity and at any given current there is a minimum mass required to conduct the electricity with only a negligible rise in temperature. The minimum mass requirements are defined by the following equation:

$$M = K \times l \times I$$

wherein:

$M$ = mass of the metal in grams
$I$ = current carried by an electrode of cross-sectional area, $A$ (height × width)
$l$ = length of the electrode
$K = D/C$ wherein:

$D$ = density of the conductor
$C$ = maximum current capacity of the conductor per unit area with negligible rise in temperature of the conductor The above equation was used to calculate the minimum mass of conductor required to pass a current of 10 amperes across the electrode, basing the maximum current capacity of the various materials on the maximum current capacity of copper, taken as 600–1000 amperes per square inch, $l$ being 9.5 centimeters. The following Table I is a tabulation of the density of various conductors measured at 20° C.; the maximum current capacity per square centimeter (C) using copper as the standard; and the minimum mass (M) required to pass a current of 10 amperes calculated using the above equation.

TABLE 1

| Conductor | Density (D) at 20° C. | Maximum current capacity per square centimeter (amperes/cm.²) (C) (basis 1,000 amps/in.²) | Minimum mass (M) (grams) |
|---|---|---|---|
| Aluminum | 2.7 | 101 | 2.54 |
| Carbon | 3.5 | 0.078 | 4,000 |
| Graphite | 2.5 | 0.33 | 720 |
| Chromium | 7.1 | 101 | 6.7 |
| Cobalt | 8.9 | 27 | 31 |
| Copper | 8.9 | 155 | 5.5 |
| Gold | 19 | 110 | 16 |
| Iron | 7.9 | 26 | 29 |
| Nickel | 8.9 | 38 | 22.3 |
| Palladium | 12 | 24 | 38 |
| Platinum | 21 | 24 | 83 |
| Silver | 11 | 164 | 6.4 |
| Tantalum | 17 | 20 | 80 |
| Titanium | 4.5 | 88 | 4.9 |
| Zirconium | 6.4 | 1.6 | 380 |

Inspection of the minimum mass requirements tabulated in the above Table I shows that of the various matreials listed, aluminum, chromium, copper, silver and titanium are comparable in terms of mass requirements which are very low as compared with the other conductors. The process of this invention makes it possible to take advantage of the fact that certain metals such as silver and titanium need be used in only very small amounts to obtain maximum conductivity. Thus, since the substrate functions as both a support and diluent for the conductor and, since the method of this invention leads to the distribution of conductor as a continuous film on and within the substrate, self-supporting electrodes are provided having conductivity properties comparable to those of a solid conductor at a minimum mass of metal. On the other hand, prior methods such as those involving the production of solid metal conductors cannot take advantage of minimum mass requirements in view of the fact that, if minimum amounts of metal such as silver or titanium are used, the electrodes would necessarily be very thin and not self-supporting thereby requiring bonding to a rigid support by special welding or mechanical bonding techniques.

In accordance with this invention, the weight ratio of inert substrate to electroconductive metal varies over a relatively wide range such as between about 10:1 and about 1:1, the particular ratio depending largely upon the conductivity of the metal deposited. For example, in the case of the more highly conductive metals such as silver and titanium, the weight ratio of substrate to metal may be as high as between about 6:1 and about 3:1, although it is to be understood that the electrode may contain heavier deposits of metal without departing from the scope of this invention.

It is to be understood that electrodes containings catalysts for fuel cell reactions or for catalyzing the electrochemical synthesis of organic compounds, may be produced in accordance with this invention. Thus, catalysts such as platinum, palladium, gold, silver, nickel, cobalt, iron, manganese, rare earth metals, etc., and their various oxides and salts and any combinations thereof are advantageously incorporated in the electrode either simultaneously with the deposition of the conductor or in a subsequent step. The catalysts are deposited on the electrode surface and inner area by the various techniques described above including the electroless and electroplating techniques, vapor deposition, sputtering, electrophoretic deposition, impregnation with catalytic precursors and subsequent decomposition to the catalytic agent, as well as by anodization of the electrode surface either with or without pretreatment with reducible salts.

In addition to the fact that the process of this invention leads to the production of electrodes of good conductivity properties at a minimum mass of metal, the porosity, surface area, shape and structure of the electrode are readily controlled. Desired porosity and surface area of the gas or liquid diffusion electrodes of this invention are obtained by controlling the surface of the substrate which is readily accomplished. For example, in accordance with the preferred embodiment of this invention, a flexible plastic or elastomeric substrate is used, the surface areas and porosity of which are controlled to preferred sizes or dimensions by methods of fabrication, by surface treatment such as heat treatment or compression, or by treating the substrate with a liquid capable of penetrating the substrate to cause pore enlargement. For example, treatment of polyethylene with a hydrocarbon solvent such as tetralin or decalin causes enlargement of the pore size. In addition, diffusion electrodes of increased surface area are provided by depositing the electroconductive metal on a substrate, the surface of which has been roughened or machined to provide a velour or sandpaper-like surface, or fibrillated surface. Another metal of producing gas or liquid diffusion electrodes of high surface area and having a maximum of reaction sites comprises first depositing a thin continuous layer of conductor within the pores of a porous substrate as described herein, followed by the deposition of a heavier layer of fine crystallites of conductor on the outer surface by electroplating at a controlled rate.

Thus by the process of this invention gas or liquid diffusion electrodes are provided in which the electroconductive metal is deposited as an adherent film having continuity within the substrate as well as on the outer surface thereof. Such continuity of contact is not achieved by mere mechanical mixing of an inert material such as plastics in the form of discrete particles with metal powder since it is not possible thereby to obtain continuous contact between the particles of metal.

In addition to the above advantages, the process of this invention is readily adapted to the manufacture of electrodes of any desired shape, merely by preforming the substrate into the shape desired for the final electrode, thereby eliminating the necessity for machining or mechanical processing of the electrodes after deposition of the metal. From this standpoint, therefore, the inert substrate is a readily moldable material such as one of the aforesaid plastic or elastomeric materials, the molding of such substrates being well known to those skilled in the art. For example, when the electrodes of this invention are to be used in gas fuel cells, polyethylene is molded into the form of a hollow porous body of any desired cross-sectional shape such as circular or rectangular, and then subjected to the plating methods described above to deposit the conductor on its surface in any desired thickness, and within the body of the porous substrate to any desired depth.

A particularly preferred form of self-supporting fluid diffusion electrode of either the gas or liquid type comprises a series of contiguous tubes the surface of which has been metallized by the method of this invention. Such electrode assemblies are prepared by molding a flexible porous substrate such as one of the above-mentioned plastics or elastomers into corrugated sheets having a substantially sinuous cross section, aligning the sheets by placing the elevations or peaks of one sheet in opposing relationship to the depressions or valleys of the other sheet such that they are brought into contact and enclose cylindrical voids, and heat sealing the sheets along the vertical plane of contact. A continuous layer of electroconductive metal is then deposited on the outer surface, which may be a velour or fibrillated surface, and within the pores of the substrate as described herein, the particularly preferred method being electroless flash plating followed by electroplating including prior sensitization of the substrate. The series of contiguous tubes can also be formed by continuous extrusion of a plastic or admixtures which subsequently can be rendered porous.

As described above, catalytic agents may be incorporated within the surface of the metallized electrode itself. Also included within the scope of this invention, is the production of catalytically active electrode assemblies comprising a layer of porous substrate having a catalyst incorporated therein by the deposition techniques described herein, sandwiched between two electrodes which may or may not be electrodes produced by the process of this invention. The preferred form of this type of assembly is prepared, for example, by positioning said catalyst layer between two electrodes (anode and cathode) one or both of which have been metallized by the process of this invention, the electrodes and catalytic layer being held or bonded together by compression or heat sealing techniques. This form of catalytic electrode may also include a current distributor such as a metal screen or perforated plate positioned between the catalyst-containing layer and the electrodes.

The following examples are offered as a better understanding of the present invention and are not to be construed as unnecessarily limiting thereto.

In each experiment, a strip of porous polyethylene (4 inches square and ⅛ inch thick) was mounted horizontally in a plastic housing which was connected to a vacuum reservoir having a three-way valve attached to a vacuum line and an air line. The plastic housing was then positioned in a glass dish to which the various treating solutions were added. In each case, the glass dish was filled with a sufficient amount of the particular treating solution so as to immerse the polyethylene mounted in the plastic casing. Circulation of the treating solution through the porous polyethylene was achieved by first reducing the pressure in the vacuum reservoir to draw the solution upwardly through the porous polyethylene into the upper portion of the plastic housing above the polyethylene, followed by increasing the pressure with air to force the solution downwardly through the polyethylene back into the glass dish. In this manner, the polyethylene was cleaned by filling the glass dish with standard sulfuric acid-sodium dichromate cleaning solution at about 50° C. by circulating it through the porous polyethylene for about 3 minutes. The polyethylene was then washed thoroughly by filling the dish with distilled water and circulating the water through the polyethylene for about 3 minutes. The glass dish was then filled with a dilute aqueous solution of stannous chloride (0.01 molar) and the polyethylene treated therewith by alternately decreasing and increasing the pressure over the mounted strip so as to force the solution therethrough. After about 3 minutes of circulating the stannous chloride solution through the polyethylene, the polyethylene was air dried for about 5 minutes. The substrate was then treated with a dilute aqueous solution of palladous chloride (0.01 molar) using the above-described circulation technique, for about 3 minutes, the stannous ion on the surface of the polyethylene reducing the palladous ion to elemental palladium. The sensitized polyethylene was then dried in air for about 10 minutes and then treated so as to deposit a thin layer of copper on its surface. Flash plating of copper was accomplished by filling the glass dish with a copper plating solution containing on the basis of one liter of solution, 16 grams of copper sulfate, 68 grams of sodium ethylene diethyl tetra-acetate, 12 grams of sodium hydroxide and 75 cc. of a 38 percent solution of Formalin. This solution was circulated through the sensitized polyethylene at room temperature for about 2 hours after which time the total surface of polyethylene was coated with a layer of copper having a thickness of about 0.2 mil.

The freshly copper plated polyethylene was then mounted in an electroplating cell and connected to the negative pole of a direct current rectifier, the positive pole of which was connected to a stainless steel screen which also was mounted in the cell. The electroplating cell was also provided with pump means for continuously circulating the electroplating solution from an electroplating solution reservoir to the cell and through the porous copper coated polyethylene. A standard commercially available silver electroplating solution of the type described herein was employed. Silver was electroplated onto the copper coated polyethylene over a period of 4 hours at a temperature of 25° C. and at a current of 5 amperes per square foot of cathode area.

Using the above procedure, a series of electrodes was prepared and are described herin as Electrodes A–J. In each instance, the weight of total metal (silver plus copper-flash plate) deposited on the polyethylene substrate was taken as the difference in weight between the polyethylene before the depositioin of any metal thereon and the finished electrode. The resistance of each of Electrodes A–J was measured at 25° C., using a conventional Kelvin Resistance Bridge. For the purpose of comparing the resistivity of the electrodes of this invention with a commercially available electrode consisting of porous silver on a metal support (Electrode K) and with the resistivity of solid silver, the measured resistances were used to calculate bulk resistivity ($\rho_B$) and the resistivity of the conductor ($\rho_C$).

The bulk resistivity is the resistivity of the whole electrode, i.e., of the metal in combination with the polyethylene substrate, and is defined by the following relationship:

$$\text{Bulk resistivity } (\rho_B) = \frac{RA}{d}$$

wherein:
R=resistance of the electrode as determined on a Kelvin bridge
A=cross sectional area of the electrode
d=distance between the two points on the electrode surface used to measure R.

The resistivity of the metal itself ($\rho_C$) is calculated using the following equation:

$$\text{Resistivity of conductor } (\rho_C) = \frac{RM}{Dd^2}$$

wherein:
R=resistance of the electrode as determined on a Kelvin bridge
M=mass of the metal deposited on the polyethylene substrate
D=density of the metal deposited
d=distance between the two points on the electrode surface used to measure R.

The above equation expressing the resistivity of the conductor is derived from the relationship:

$$\rho_C = \frac{RA}{d}$$

wherein R and d are as above defined and where A is now the cross-sectional area of a solid sheet of the metal deposited rather than the cross-sectional area of the metal plus the substrate as in the case of the bulk resistivity.
Since A=height ($h$)×width ($w$)

$$h = \frac{\text{volume of metal deposited}}{\text{surface area of the electrode}} = \frac{\text{mass of metal}}{\text{density} \times SA}$$

$SA$=surface area of the electrode=length ($d$)×width ($w$)

$$A = \frac{\text{Mass}}{\text{density} \times \text{length}}$$

Therefore, $$\rho_C = \frac{RA}{d} = \frac{RM}{Dd^2}$$

The following Table II sets forth for each of electrodes A–J, the total metal content, the measured resistivity (R), the distance between the two points on the electrode used to measure the resistivity $d$, the cross-sectional area of the electrode (A), the bulk resistivities ($\rho_B$), and the resistivity of the metal conductor ($\rho_C$) which were calculated using the above equations. In each instance, the density of the metal deposited was taken as the density of the pure metal.

TABLE II

| Electrode | A | B | C | D | E | F | G | H | I | J |
|---|---|---|---|---|---|---|---|---|---|---|
| Substrate | Polyethylene | | | | | | | | | |
| Flash plated metal | Copper | | | | | | | | | |
| Electroplated metal | Silver | | | | | | | | | |
| Mass of metal (grams) | 5.1 | 5.0 | 5.6 | 5.4 | 8.2 | 6.4 | 6.2 | 8.3 | 9.7 | 7.7 |
| Measured resistance (R)×10⁻⁴ | 3.9 | 4.7 | 4.0 | 3.1 | 3.0 | 4.5 | 4.3 | 2.4 | 2.6 | 3.3 |
| Distance between two points on electrode to measure R (cm.) | 4.8 | 4.8 | 4.8 | 4.8 | 4.8 | 4.8 | 4.8 | 4.8 | 4.8 | 4.8 |
| Cross-sectional area (A) | 2.4 | 2.4 | 2.4 | 2.4 | 2.4 | 2.4 | 2.4 | 2.4 | 2.4 | 2.4 |
| Bulk resistivity, ohm-cm.×10⁻⁴ | 2.0 | 2.4 | 2.0 | 1.6 | 1.5 | 2.3 | 2.2 | 1.2 | 1.3 | 1.7 |
| Resistivity of metal conductor, ohm-cm.×10⁻⁶ | 4.0 | 4.7 | 4.5 | 3.3 | 4.9 | 5.7 | 5.3 | 4.0 | 4.9 | 5.0 |

Inspection of the data set forth in Table II above shows that the bulk resistivity of the electrodes of this invention, i.e., Electrodes A–J, varied between about 1.2 and about 2.4×10⁻⁴ ohm-cm. which is only between half and one order of magnitude more than that of a commerical porous silver electrode having a total weight of 150 grams, designated herein as Electrode K which has a bulk resistivity of 0.22×10⁻⁴ ohm-cm. Thus, it is seen that the advantages of the electrodes of this invention as discussed herein are realized without an appreciable adverse effect on the performance of the electrodes. Reference to the calculated resistivities of the metal conductor deposited on the polyethylene of the electrodes of this invention, shows that these values varied from 3.3 to 5.7×10⁻⁶ ohm-cm. which is of the same order of magnitude as the resistance of pure silver which is 1.6×10⁻⁶ ohm-cm. Since the resistivities of the conductor of Electrodes A–J are comparable to the resistance of solid silver, it is demonstrated that the process of this invention allows for the deposition of electroconductive metal at the surface and within the pores of the polyethylene substrate, as a continuous layer or film of metal, and that the polyethylene functions as a homogeneous diluent. The results also show that good distribution of the metal throughout the electrode was obtained.

The electrodes produced in accordance with this invention and particularly those comprising porous substrates are especially useful in fuel cell systems including those in which a gaseous and/or liquid electrode reactant is employed. For example, the porous electrodes are suitably employed as diffusion electrodes in fuel cells in which a reducing agent such as hydrogen, hydrocarbons or alcohols such as methanol is used as a reactant and also as diffusion electrodes for oxidizing gases such as oxygen, air, chlorine, bromine, etc. The electrolytes of such cells may be aqueous, acidic, basic, non-aqueous, molten inorganic salts, liquified gases such as ammonia, etc. Such fuel cells are well known to those skilled in the art and are typically represented by the hydrogen-oxygen and hydrocarbon-oxygen fuel cells. The products of this invention are also useful as electrodes in electrolysis cells such as those in which chlorine is produced from brine, as electrodes in cells in which organic or inorganic compounds are synthesized, as well as in batteries in which the electrodes are of a porous structure as in silver-zinc and silver-nickel batteries.

By way of illustrating the performance of the electrodes produced in accordance with this invention, the above-described Electrode J comprising silver deposited on porous polyethylene was used as the oxygen diffusion electrode in a sodium amalgam-oxygen fuel cell. Molecular oxygen was used as the oxidizing reactant and amalgam containing 0.2 weight percent sodium was used as the reductant. The system was operated at 150° F. using 50 percent aqueous sodium hydroxide as the electrolyte. Prior to passage of oxygen through Electrode J, the electrode surface was activated by the anodization technique. The power performance of the system is shown by the following tabulation:

| Cell voltage (volts): | Current density (amperes/ft.$^2$) |
|---|---|
| 1.85 | Open circuit |
| 1.49 | 50 |
| 1.38 | 100 |

The various voltages obtained were stable and the response to load variations were instantaneous.

It was noted that when the silver was removed from the outer surface of electrodes produced in accordance with the above examples, as demonstrated by the fact that the measured resistance across the surface was very high, the electrode was grayish in color indicating that silver was still present within the pores of the polyethylene substrate. Such electrodes, however, were still performing satisfactorily and gave open circuit potentials comparable to that of the freshly prepared electrodes, thereby further demonstrating that the method of this invention leads to good distribution of conductor within the pores of the substrate.

The process of this invention may be conducted in a batchwise or continuous manner. For example, in conducting the plating methods continuously, a flexible substrate such as plastic, elastomeric or woven materials, in the form of a sheet or other desired preformed shape is supported on rollers or other suitable means and continuously passed through the various solutions described herein. For example, a sheet of porous substrate such as polyethylene of any desired cross section is passed continuously through a zone in which the surface of the substrate is cleaned such as by treatment with warm chromic acid cleaning solution, a zone in which the substrate is rinsed, a pore enlargement zone when it is desired to deposit larger quantities of conductor within the surface of the substrate, a sensitization zone in which nucleating metallic sites are deposited on the substrate by the above described two stage method, a zone in which a layer of conductor is deposited by the above described flash plating or electroless technique, an electroplating zone in which heavier deposits of conductor are deposited on the substrate and a fabrication zone in which the substrate is brought to desired dimensions. The process of this invention may also be carried out in a continuous manner when a rigid substrate is used such as ceramics or refractory materials, in which case the rigid substrate, suspended from movable hangers or other suitable suspending means, is treated with each solution in successive fashion by lowering and raising the suspending means.

It is to be understood that various alterations and modifications of the electrodes and the process of this invention may become apparent to those skilled in the art without departing from the scope of this invention.

Having described my invention, I claim:

1. A catalytically active electrode assembly which comprises a layer of a porous inert material having deposited within the pores thereof a catalytic agent, said layer being positioned between two porous electrodes composed of a porous non-metallic substrate having deposited thereon and within the pores thereof an adherent and continuous layer of electroconductive metal and having a current distributing means between said layer and said electrodes.

References Cited

UNITED STATES PATENTS

| 2,872,341 | 2/1959 | Stein | 117—107 |
| 2,993,806 | 7/1961 | Fisher et al | 117—107 |
| 353,141 | 11/1886 | Kendall | 136—86 |
| 3,020,327 | 2/1962 | Reutschi | 136—86 |
| 3,116,170 | 12/1963 | Williams et al. | 136—86 |
| 3,160,527 | 12/1964 | Hess | 136—86 |

ALLEN B. CURTIS, *Primary Examiner.*

WINSTON A. DOUGLAS, *Assistant Examiner.*

PO-1050
(5/69)

UNITED STATES PATENT OFFICE
CERTIFICATE OF CORRECTION

Patent No. __3,400,019__   Dated __September 3, 1968__

Inventor(s) __Joseph Adrien M. LeDuc__

It is certified that error appears in the above-identified patent and that said Letters Patent are hereby corrected as shown below:

Column 2, line 69, "coinductive" should read -- conductive --. Column 3, line 39, "chloroplatinict" should read -- chloroplatinic --. Column 6, Table I, line 33, opposite "Palladium" and in the last column, for "38" read -- 48 --; line 41 "matreials" should read -- materials --; line 73 "containings" should read -- containing --. Column 7, line 36, "metal" should read -- method --. Column 9, line 30, "depositioin" should read -- deposition --. Column 10, line 31, "resitivities" should read -- resistivities --.

SIGNED AND
SEALED

JUL 14 1970

(SEAL)
Attest:

Edward M. Fletcher, Jr.
Attesting Officer

WILLIAM E. SCHUYLER, JR.
Commissioner of Patents